United States Patent

[11] 3,620,885

| [72] | Inventor | Leo M. Schlaudroff. Fort Wayne, Ind. |
|---|---|---|
| [21] | Appl. No. | 11,738 |
| [22] | Filed | Feb. 16, 1970 |
| [45] | Patented | Nov. 16, 1971 |
| [73] | Assignee | General Electric Company |

[54] APPARATUS FOR APPLYING UNHARDENED ADHESIVE MATERIAL TO A LAMINATED STRUCTURE
8 Claims, 8 Drawing Figs.

[52] U.S. Cl. .................................................. 156/563, 29/596, 310/42
[51] Int. Cl. .................................................. H02k 15/12, B32b 31/12
[50] Field of Search ........................................ 156/60, 92, 305, 556, 563; 29/596; 118/219, 233, 254; 269/52; 310/42, 45

[56] References Cited
UNITED STATES PATENTS

| 3,356,360 | 12/1967 | Ward ............................ | 156/563 X |
| 3,518,754 | 7/1970 | Pleiss et al. ................... | 118/219 X |
| 2,978,371 | 4/1961 | Baciu ............................ | 156/305 |
| 3,349,478 | 10/1967 | DeJean ......................... | 310/42 X |
| 3,490,143 | 1/1970 | Hull .............................. | 310/42 X |
| 3,408,734 | 11/1968 | Leahy et al. .................. | 29/596 |

Primary Examiner—Benjamin A. Borchelt
Assistant Examiner—James M. Hanley
Attorneys—John M. Stoudt, Radford M. Reams, Ralph E. Krisher, Jr., Frank L. Neuhauser and Oscar B. Waddell ABSTRACT: An apparatus for applying an adhesive bonding material to a stack of laminations forming a laminated core for use in an inductive device, the core having a plurality of spaced-apart tooth sections with at least some of the laminations having spaces therebetween at the termination portions of the tooth sections. The apparatus includes an applicator, carrying on its periphery unhardened adhesive material, and means for mounting the core for engaging the termination portions of the at least some of the laminations with the unhardened adhesive material. The applicator and the core are moved relative to one another so that the applicator moves sequentially across the termination portions of the tooth sections for applying the unhardened adhesive material to the core. After the applicator moves across the termination portions of the tooth sections, the core is moved away from engagement with the unhardened adhesive material on the applicator.

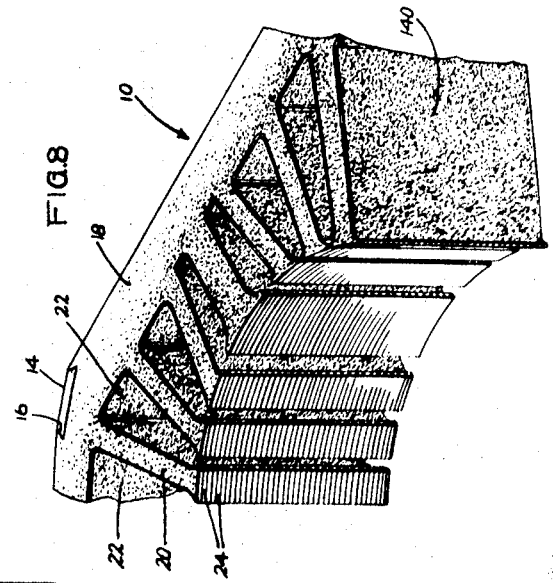
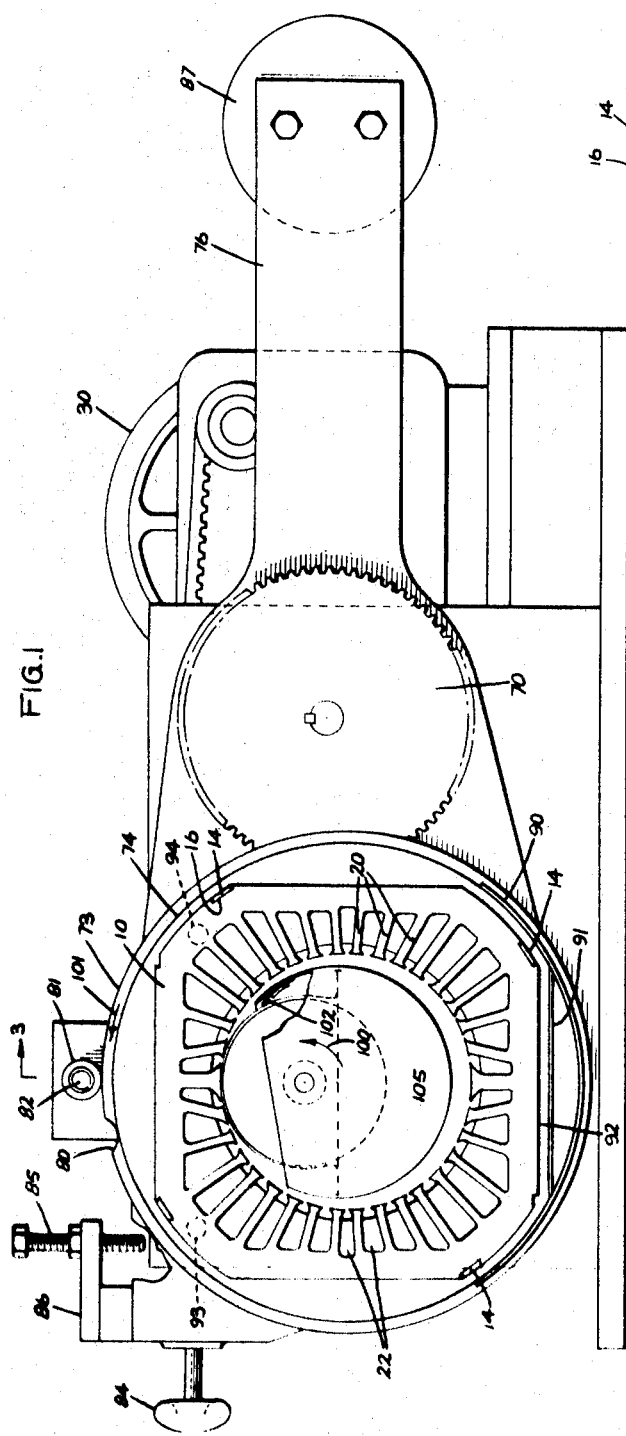
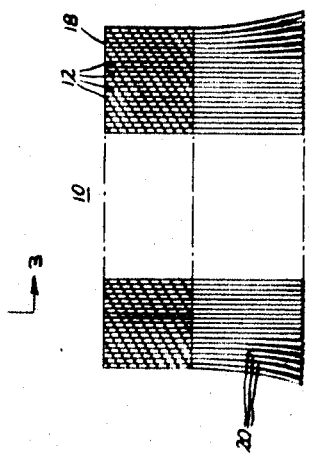
Inventor:
Leo M. Schlaudroff,
By *Radford M. Reams*
Attorney.

Inventor:
Leo M. Schlaudroff,
By Radford M. Reams
Attorney.

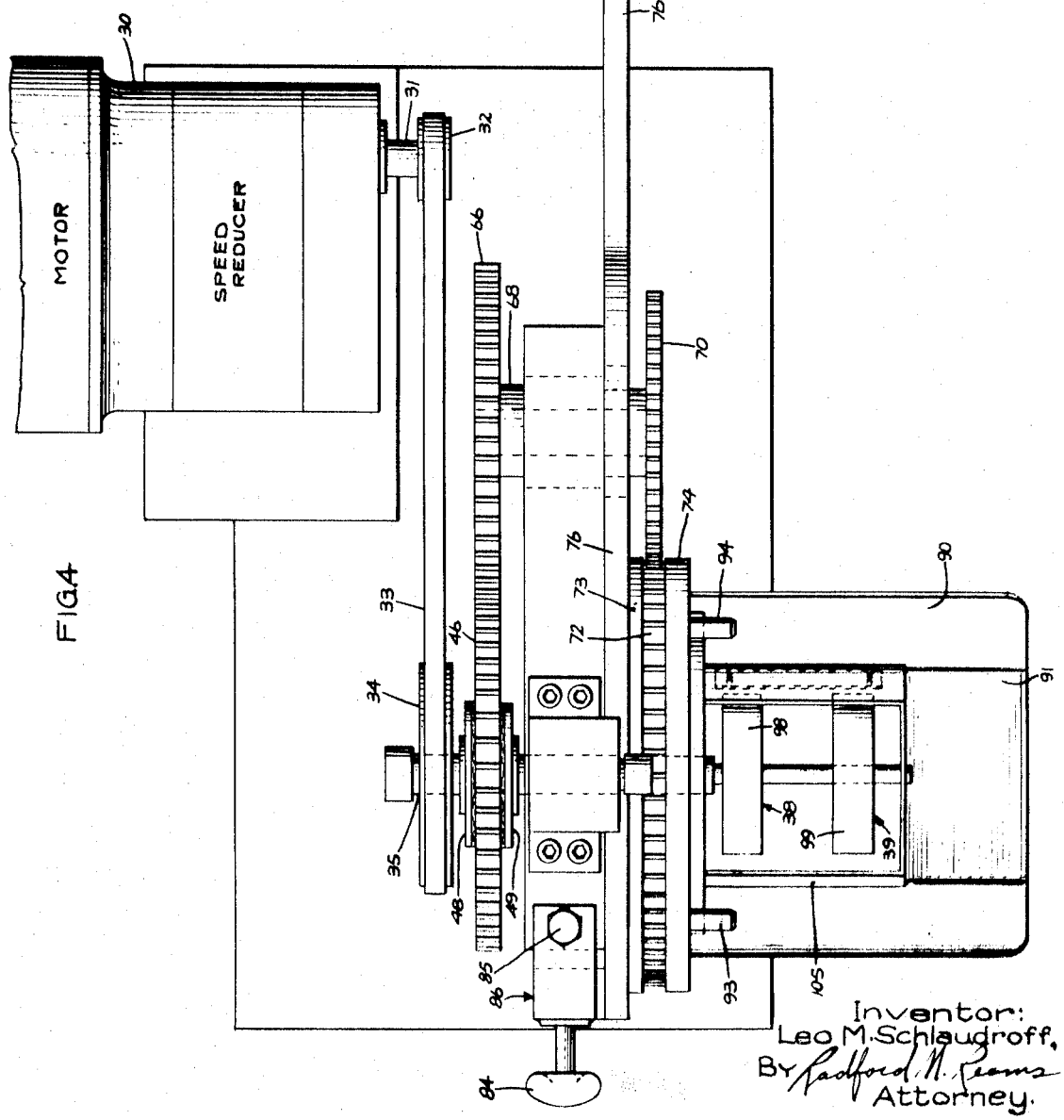

ions Ser. No. 609,051, filed for Harold R. Van Derzee on Jan. 13, 1967, now U.S. Pat. No. 3,533,867, issued on Oct. 13, 1970, and application Ser. No. 802,934, filed for Marion W. Sims on Feb. 27, 1969.

BACKGROUND OF THE INVENTION

This invention relates generally to apparatus for making laminated structures, and more particularly to apparatus for applying an unhardened adhesive bonding material to a laminated structure.

Electric conductive devices such as transformers and dynamoelectric machines conventionally include one or more core members, for example, dynamoelectric machines, i.e., motors and generators, conventionally include a stator core member and a rotor core member concentrically disposed with regard to the stator core member. At least one and frequently both of the core members have a plurality of coil or conductor receiving slots formed therein; in the case of a stator core member, the winding slots conventionally extend radially outward from a central bore and are formed by a number of spaced-apart generally radially extending tooth sections. The core members are conventionally formed by securing together in a stacked configuration a plurality of relatively thin laminations punched from magnetic steel. The individual laminations often are not completely flat, that is, their side faces are not completely planar, and they may have small burrs along the edges. Conventionally the laminations forming the stator cores are secured together in a tightly stacked relation adjacent the outer edge of the stator core by some suitable means such as welding. Even when the laminations of the stator are secured tightly together in the outer or yoke portion the individual laminations may have spaces therebetween. This is particularly true at the termination portions of the tooth sections, that is adjacent the bore. This tendency for there to be spaces between laminations is most prevalent at the axial ends of the stator. When such stator cores are assembled with rotor cores and appropriate windings to form a completed motor, the spaces may cause the stator core to have less rigidity and structural integrity than is desirable and could, in fact, cause interference between the stator and the rotor.

It has also become desirable to provide an insulating material on stator cores, particularly along the surfaces forming the periphery of the coil or conductor receiving slots. It is generally very economical and expeditious to apply this insulating material either in a fluid form or as a powdered spray to form an integral insulation layer. Where there are spaces between individual laminations, as at the termination portion of the individual tooth sections, the integral insulation covering may not be an uninterrupted layer over the entire slot periphery, thus defeating the purpose of the integral insulation.

In the prior art, mechanically clamping means and magnetic fields have been used to compress the core laminations during application of the integral insulation forming material. Examples of this prior art may be found in the aforementioned Sims application and in U.S. Pat. No. 2,978,371—Baciu.

SUMMARY OF THE INVENTION

It is therefore an object of the present invention to provide an improved apparatus for applying an unhardened adhesive bonding material to a laminated structure.

It is another object of the present invention to provide such an apparatus for applying unhardened adhesive bonding material to fill spaces between adjacent laminations at the termination portions of the tooth sections of a laminated core for use in an inductive device.

In carrying out the present invention in one form thereof, there is provided an apparatus for applying adhesive bonding material to a stack of laminations forming a laminated core for use in an inductive device, the core having tooth sections with at least some of the laminations having spaces therebetween at the termination portions of the tooth sections. The apparatus includes applicator means carrying on its peripheral surface unhardened adhesive material. Means is provided for mounting the core for engaging the termination portions of the at least some of the laminations with the unhardened adhesive material on the peripheral surface of the applicator means. Means are included for providing relative rotary motion between the applicator means and the termination portions of the tooth sections for passage of the applicator means sequentially across the periphery of the tooth sections to apply unhardened adhesive material to the termination portions of the at least some of the laminations.

BRIEF DESCRIPTION OF THE DRAWINGS

FIG. 1 is a front elevational view of an apparatus for applying unhardened adhesive material to a laminated structure in accordance with one embodiment of the present invention;

FIG. 2 is a fragmentary cross-sectional view taken through one of the slots of the stator core shown in FIG. 1 to illustrate one manner in which the axial outermost laminations may flare apart or otherwise may have spaces therebetween adjacent the termination portion of the tooth sections;

FIG. 4 is a top plan view of the apparatus illustrated in FIG. 1, without a laminated core mounted thereon;

FIG. 5 is a side elevational view, somewhat schematic in form, illustrating another applicator drum suitable for use in the apparatus of FIG. 1;

FIG. 8 is a partial perspective view of a completed core after an integral insulating coating has been formed on selected surfaces thereof.

DESCRIPTION OF THE PREFERRED EMBODIMENTS

Figure 3:
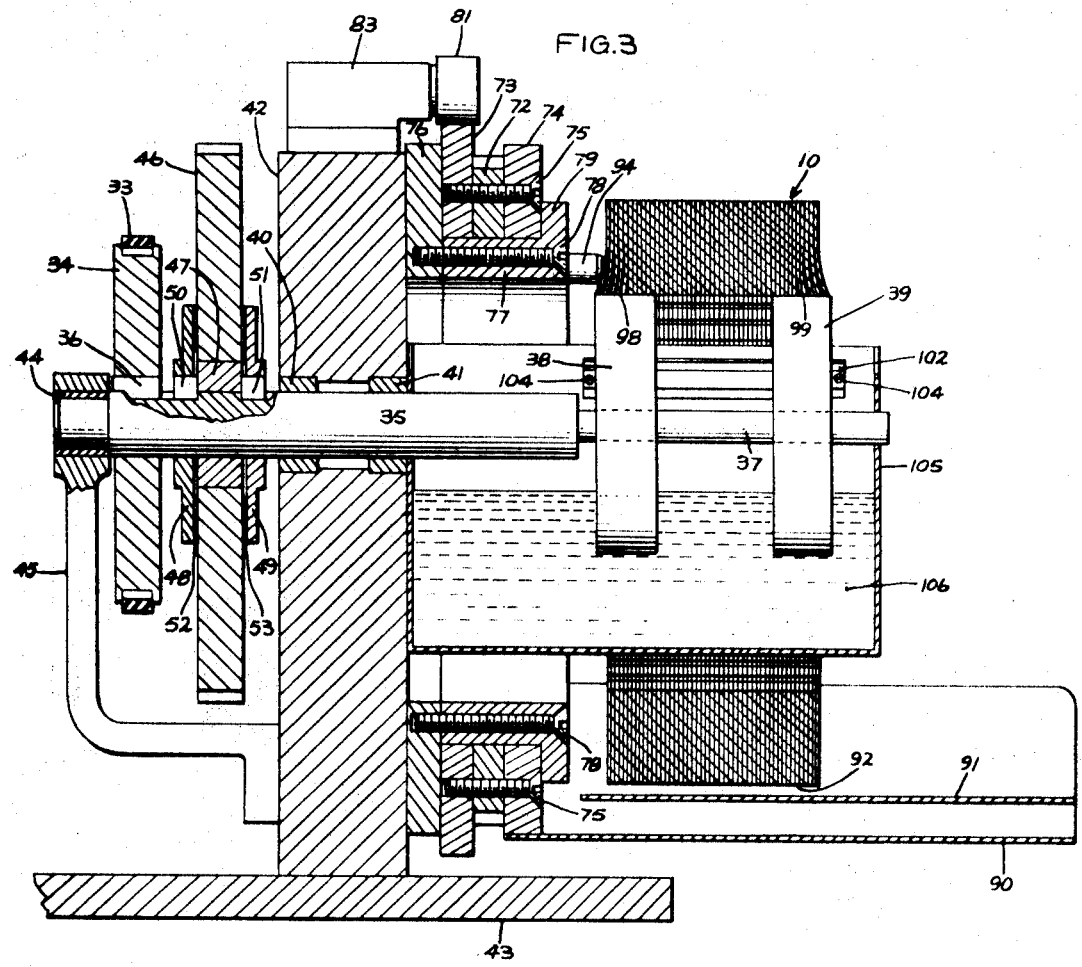
FIG. 3 is an enlarged cross-sectional view as seen along line 3—3 in FIG. 1.

Turning now to the drawings in more detail and in particular to FIGS. 1–4 inclusive, there is illustrated an exemplification apparatus for applying unhardened adhesive bonding material to a laminated structure in accordance with one embodiment of the present invention. The laminated structure is illustrated in the form of a stator core 10 especially adapted for use in fractional and small horsepower-size dynamoelectric machines. The illustrative core 10 is conventionally fabricated from a plurality of laminations 12 punched from suitable sheet material and held together in a stacked relation by a plurality of keys 14 frictionally held in grooves 16 extending axially across the yoke section 18 of the core. Other conventional means for holding the laminations in stacked relation include longitudinal welds extending along the outer peripheral surface of the yoke section 18 at selected positions. As best seen in FIGS. 1 and 2, the core 10 comprises the yoke section 18 and a number of inwardly projecting tooth sections 20 which form angularly spaced-apart coil or conductor accommodating slots 22. The free ends of the tooth sections are formed as termination portions 24 which define therebetween entrances to the slots 22. A central rotor receiving bore is defined by the peripheral surface of the termination portions of all of the tooth sections.

Even though the laminations of the core are mechanically clamped together in the yoke section 18 by means of the keys 14, for instance, the portions of the laminations forming the tooth sections 20 tend to have spaces therebetween particularly at their termination portions, that is at the termination portions of the tooth sections 20. These spaces may be caused by flaring apart of adjacent laminations, nonplanar side faces of the laminations or small burrs along the laminations, for instance. These spaces, particularly flaring between adjacent laminations, are particularly noticeable in the axially outermost laminations of the tooth sections. This condition is shown in somewhat exaggerated form in FIG. 2 for purposes of illustration.

In FIGS. 1, 3 and 4 there is illustrated in detail an exemplification apparatus for applying an unhardened adhesive bonding material to the tooth sections, and more particularly to the termination portions of the axially outermost laminations, for bonding together the laminations into a strong rigid core presenting substantially continuous surfaces for subsequent application of insulating material. In the exemplification apparatus an electric motor and speed reducer 30 drives a shaft 31 having affixed thereto a toothed pulley 32. Pulley 32 meshes with and drives a toothed belt 33, which in turn drives a toothed pulley 34 fixed to another shaft 35 by means of a key 36. Fixed to a reduced portion 37 of shaft 35 is an adhesive bonding applicator means in the form of a pair of applicator drums 38 and 39. Shaft 35 is supported for rotation in bearings 40 and 41 mounted in a frame 42 fixed to a base member 43. The end of the shaft 35 remote from the drums 38 and 39 is also supported for rotation in a bearing 44 mounted in a support member 45 fixed to the frame 42. A gear 46 is mounted for free rotational movement about shaft 35 by a bearing 47 and is sandwiched between a pair of friction clutch members 48 and 49, which are mounted to the shaft 35 by keys 50 and 51 respectively. The clutch members 48 and 49 have integral clutching surfaces 52 and 53 respectively, which are made of a suitable friction material and bear against the sides of gear 46. Thus, as the clutch members 48 and 49 rotate they tend to rotate the gear 46 with a predetermined maximum force. That is, if the resistance to the turning of gear 46 exceeds a predetermined amount the friction clutches 48 and 49 will slip with respect to the gear 46 so that the shaft 35 will rotate without rotating the gear.

Gear 46 meshes with and drives another gear 66 fixed to a shaft 68 which drives another gear 70. Gear 70 meshes with a gear 72. The gear 72 is mounted between a pair of bearing plates 73 and 74 by some suitable means such as bolts 75. Each of the bearing plates 73 and 74 has a diameter larger than the diameter of gear 72, with the bearing plate 73 having a greatest diameter.

An arm 76 is pivotally mounted on the shaft 68. At one of its ends the arm 76 receives and supports a generally annular bearing member 77 which is mounted to the arm 76 by some suitable means such as bolts 78. The gear 72, with its bearing plates 73 and 74, is held between the pivoted arm 76 and the bearing 77 by a generally radial extension 79 of the bearing 77. Thus the gear 72, bearing plate 73, and bearing plate 74 are free to rotate about the bearing 77 while at the same time being constrained for pivotal movement with the arm 76. Since the gear 70 and arm 76 are both pivoted about the shaft 68, pivoting movement of arm 76 will not cause binding between the gears 70 and 72.

As best seen in FIGS. 1 and 3, the outer peripheral edge of bearing plate 73 is provided with an indentation 80 which is positioned to selectively engage a roller 81 supported for free rotation on a shaft 82 which, in turn, is supported by a mounting block 83 on the frame 42. When the roller 81 is engaged in the indentation 80 it exerts a restraining force on the bearing plate 73 which is carried back through gear 72, gear 70, shaft 68 and gear 66 to gear 46. This force is sufficient that the friction clutch members 48 and 49 will slip with respect to gear 46 and the shaft 35 will rotate without rotating gear rotating gear 72 and bearing plates 73, 74.

In order to release bearing plate 73 so that the combination of gear 72 and bearing plates 73, 74 may rotate with the shaft 35, the left-hand end of arm 76 (as seen in FIG. 1) is provided with a handle 84 by which the roller 81 may be released from the indentation 80. When the user pushes down on handle 80, arm 76 is rotated about shaft 68, thus lowering the cam plate 73 to release the roller from the indentation. Thereafter gear 46, acting through gear 66, shaft 68 and gear 70, rotates gear 72 and bearing plates 73, 74 about bearing 77. Upon release of the handle 84 the peripheral edge of the bearing plate 73 will rotate against the roller 81 for complete revolution of the bearing plate 73, after which the roller 81 will drop into the indentation 80 and prevent further rotation of the bearing plate 73.

In order to prevent undue depression of the left-hand end of arm 76, an adjustable setscrew 85 is threadedly mounted in a plate 86 attached to the left-hand end of arm 76. The setscrew 85 is adjusted to engage the top portion of frame 42 just after roller 81 has cleared indentation 80. A counterweight 87 is mounted at the other or right-hand end of arm 76 and biases the arm for clockwise rotation to ensure engagement of the periphery of cam plate 73 with roller 81 at all times when handle 84 is not depressed.

As best seen in FIGS. 1, 3 and 4, a trough 90 is welded or otherwise fixably attached to a segment of the outer periphery of bearing plate 74 opposite the location of indentation 80 in bearing plate 73. A flat plate 91 is welded across the bottom of the trough 90 to releasably engage the lower flat surface 92 of stator core 10. With the arm 76 pivoted to its most clockwise position (that is, with roller 81 in indentation 80), the stator core 10 may be placed with its flat bottom portion 92 resting against the flat plate 91 and slid over the applicator drums 38 and 39 until one lateral face of the core engages position pins 93 and 94. The positioning pins are mounted on bearing plate 74 in positions to engage the yoke section 18 of the core. With the arm 76 in this position, the termination portions 24 of the tooth sections 20 of the core are spaced from the peripheral surfaces 98, 99 of the applicator drums 38, 39 respectively. It will be understood that by use of some suitable means such as setscrews the applicator drums 38 and 39 may be adjusted along the reduced portion 37 of shaft 35 so as to be brought into alignment with selected axial portions of the core 10 when the core is mounted in the trough and against the positioning pins and then locked into place. In the most frequent application, the drums will be positioned adjacent the axially outermost laminations as those are the ones which most often have spaces therebetween.

Fixed to the frame 42 is a reservoir or tank 105 containing a supply of unhardened adhesive bonding material 106 which may, for example, be heat hardenable epoxy resin in a somewhat viscous liquid form, i.e., in a state of plasticity, for example, as described in U.S. Pat. No. 3,490,143—B. Hull. The level of liquid 106 is such that the lower portions of the applicator drums 38 and 39 are immersed in the liquid. In operation of the apparatus, the shaft 35 constantly rotates the applicator drums 38, 39 so that the peripheral surfaces 98, 99 of applicator drums are continuously rotated through the unhardened adhesive material.

In order to apply the adhesive bonding material to selected portions of a core, a core 10 is placed on the apparatus with the flat surface 92 resting against the flat plate 91, and one lateral face of the core engaging the positioning pins 93 and 94. Then the operating handle 84 is momentarily depressed to release the roller 81 from the indentation 80. This drops the flat plate 91 and trough 90 away from the lower portion of the core 10 so that the core moves downwardly and the termination portions of the tooth sections 22 engage the adhesive material on the peripheral surfaces 98, 99 of the applicator drums 38, 39. The applicator drums are rotating in the direction shown by arrow 100 so that they engage the adhesive bonding material with the peripheral portion of the tooth sections, particularly the peripheral portions of the laminations having spaces therebetween. Engagement of the termination portions of the tooth sections, particularly the termination portions of the axially outer laminations of the core, with the unhardened adhesive material on the peripheral surfaces 98, 99 causes the core to rotate in the same direction as the applicator drums, with the peripheral surfaces of the applicator drums progressing across the termination portions of the individual tooth sections. At the same time gear 72 and bearing plate 73, 74 are rotated in the same direction, as indicated by arrow 101. The various gears are chosen so that the gear 72, bearing plates 73, 74, trough 90 and flat plate 91 rotate at the same angular speed as the applicator drums 38, 39 and the core 10. Should the core 10 slip with respect to the applicator drums, it will quickly engage the trough or flat plate and further slippage will be prevented, thus assuring complete application of the adhesive material. When the bearing plate 73 has made one complete revolution, the roller 81 will enter the indentation 80, allowing arm 76 to pivot in a clockwise direction. This causes flat plate 91 to reengage the lower flat surface 92 of the core 10 and raise the core sufficiently that adhesive material is no longer transferred from the peripheral surfaces of the applicator drums 38, 39 to the termination portions of the tooth sections. The core 10 then may be removed from the apparatus and replaced with another core, which is then similarly treated. The continuous rotation of the applicator drum, even when a core is not being treated, assures that the adhesive bonding material on the peripheral surfaces of the drum does not dry or become tacky.

To assure that appropriate predetermined amounts of adhesive bonding material are available for transfer to the termination portions of the tooth sections, a gauge means in the form of a doctor blade 102 is mounted to the sidewall of the tank 105 by some suitable means such as strips 103 and screws 104. The doctor blade has a shorter radius than the sidewall of the tank 105 so that, by appropriate positioning of the blade, its edge may be adjusted with respect to the peripheral surfaces 98, 99. Thus, as the peripheral surfaces of the applicator drums 38 and 39 come out of the adhesive material 106 and progress toward their engagement with the termination portions of the tooth sections, they must pass the doctor blade so that any excessive thickness of adhesive material is scraped off.

If desired, suitable clamps may be provided to engage the lateral or side faces of the core to clamp the axially outer laminations together in the event there are spaces between laminations which are excessive. In normal treatment of a core, part of the adhesive material placed on the termination portions is drawn up between laminations by a wicking or capillary action so as to substantially completely fill the spaces between laminations. When the adhesive bonding material hardens, the hardened material and laminations together form continuous surfaces, particularly along the sides of the slots 22 as they extend axially through the core. If there are spaces between laminations which are too wide this wicking or capillary action cannot occur. In some small percentage of cases it may be desirable to clamp the sides of the core together to assure the capillary action. There are many types of clamps available which are suitable for this purpose. It will be remembered that where such clamps are used they should remain on the core until the adhesive bonding material has hardened.

Figure 6:
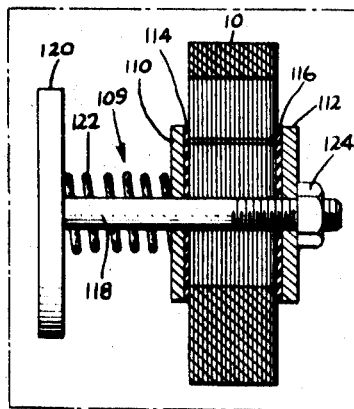
FIG. 6 is a somewhat schematic view, partially in section, showing an apparatus for clamping the tooth sections of the core while the adhesive bonding material is being hardened.

The hardening of adhesive bonding material such as that described in the aforementioned Hull patent may be enhanced by the application of heat in an oven to thereby firmly bond together the laminations. Preferably the tooth sections are clamped together during this heat curing or heat hardening. By way of illustration FIG. 6 shows, in somewhat schematic form, the core 10 placed in a clamp 109 having two clamping plates 110 and 112, each having a layer of polytetrafluoroethylene 114 and 116 or some similar material on its surface which engages the outer lamination of the core, thereby preventing sticking of the adhesive material to the clamping plates. The clamping plates are slideably mounted on a bolt 118 fixed to a base 120. A spring 122 biases the plate 110 against one end of the core and the bolt 118 passes through the bore of the core so that the nut 124 may be tightened to force the clamping members together, thereby compressing the laminations at the termination portions of the tooth sections. The clamp 109, containing a core 10, then is placed in an oven schematically illustrated at 126 where the adhesive material, such as the epoxy resin type described in the aforementioned Hull patent, for example, is cured and hardened by the heat of the oven thereby firmly bonding together the laminations. This heat may be supplied by heat lamps in the oven, for example.

Figure 7:
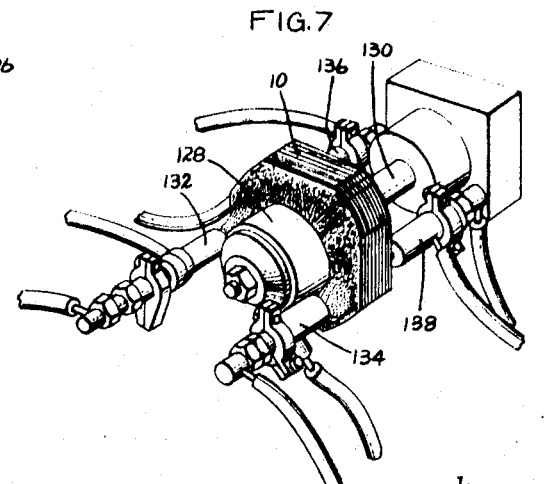
FIG. 7 is a fragmentary perspective view of a portion of an apparatus for applying powered insulating material to the heated core.

The heat applied to cure the adhesive material may also be used to preheat the core to the proper temperature for the application of a powdered insulating material such as that described in U.S. Pat. No. 3,355,310—DeJean et al., for example. The apparatus described in the DeJean et al. patent is partially illustrated in FIG. 7 and shows the core 10 mounted on a core holder and mask assembly 128, which is rotated by a shaft 130 to locate the core between two pairs of nozzles 132, 134 and 136, 138. These nozzles spray fluidized powdered insulating material on selected surfaces of the preheated core as, for example, the lateral faces and the surfaces forming the axially extending slots. As illustrated in FIG. 8, for example, the integral insulating coating is identified by the reference numeral 140 and is formed on the outer lateral surfaces of the outer laminations of the core 10 and on the surfaces of the slots 22 between the teeth 20. However, no insulation is formed on the termination portions 24 defining the entrances to the slots or on the radially inner surfaces of the termination portions 24 defining the bore.

FIG. 5 illustrates a modified applicator means or drum 142 having a peripheral surface 144 of sufficient size to extend completely across the termination portions 24 of the tooth sections of the core 10. This form of applicator drum is used when it is desired to apply adhesive material along the entire axial length of the termination portions of the tooth sections, rather than just at the outermost laminations as previously described.

It will be understood from the foregoing description that, although the illustrated exemplifications of the principles of the invention were applied to a laminated stator core for use in a dynamoelectric machine, the invention can be advantageously carried out with laminated rotors for dynamoelectric machines and other laminated structures adapted for use in other electromagnetic devices where it is desired to bond together laminations having spaces therebetween at the termination portions of the tooth sections. In particular, even though a stator core with a central bore has been illustrated it specifically will be understood that a rotor core having tooth sections extending generally outwardly from the center of the core rather than inwardly may also contain laminations which have spaces therebetween and to which an adhesive material may be applied in accordance with the present invention to bond together the laminations. It also will be understood that the application of the adhesive bonding material and its curing or hardening to form a unified structure has advantages even where it is not desired to provide an insulating material on selected surfaces of the core.

It should be apparent to those skilled in the art that while I have described what, at present, is considered to be the preferred embodiments of this invention, in accordance with the Patent Statutes, changes may be made in the disclosed apparatus and method without actually departing from the true spirit and scope of the invention.

What I claim as new and desire to secure by Letters Patent of the United States is:

1. Apparatus for applying an adhesive bonding material to a stack of laminations forming a laminated core for use in an inductive device, the core having tooth sections with at least some of the laminations having spaces therebetween at the termination portions of the tooth sections; said apparatus including: applicator means carrying on its peripheral surface unhardened adhesive material; means mounting the core for engaging the termination portions of the at least some of the laminations with unhardened adhesive material on the peripheral surface of said applicator means; and means for providing relative rotary motion between said applicator means and the termination portions of the tooth sections for passage of said applicator means sequentially across the periphery of the tooth sections to apply unhardened adhesive material to the termination portions of the at least some of the laminations.

2. Apparatus as set forth in claim 1 wherein said mounting means is effective to move the termination portions of the at least some of the laminations away from said applicator means subsequent to passage of said applicator means sequentially across the termination portions of selected tooth sections.

3. Apparatus as set forth in claim 1 further including supply means for supplying unhardened adhesive material to the periphery of said applicator means for subsequent application to the termination portions of the at least some of the laminations.

4. Apparatus as set forth in claim 1 wherein said supply means includes a reservoir containing a supply of unhardened adhesive material; said applicator means being mounted so that a portion of the periphery of said applicator means is continuously immersed in the supply of unhardened adhesive material.

5. Apparatus for applying an adhesive bonding material to a stack of laminations forming a laminated core for use in an inductive device, the core having a plurality of spaced-apart tooth sections forming spaced-apart conductor receiving slots with termination portions of adjacent tooth sections forming the entrance for the slot therebetween, at least some of the laminations having spaces therebetween at the termination portions of the tooth sections, said apparatus including: applicator means having a peripheral surface for carrying unhardened adhesive material; supply means for supplying unhardened adhesive material to the peripheral surface of said applicator means; mounting means for positioning the core in spaced relation to said applicator means and with the at least some of the laminations aligned with said applicator means, said mounting means being adapted selectively to allow predetermined engagement between the core and unhardened adhesive material on the peripheral surface of said applicator means; and means for providing relative rotary motion between said applicator means and the termination portions of the tooth sections for passage of said applicator means sequentially across the termination portions of the tooth sections to transfer unhardened adhesive material from said applicator means to the at least some of the laminations.

6. Apparatus as set forth in claim 5 wherein said mounting means is effective to move the core from engagement with the unhardened adhesive material on the peripheral surface of said applicator means subsequent to passage of said applicator means sequentially across the periphery of selected tooth sections.

7. Apparatus as set forth in claim 5 further including gauge means positioned to assure that no more than a predetermined amount of unhardened adhesive material is on said peripheral surface of said applicator means for transfer to the core.

8. Apparatus as set forth in claim 5 wherein said supply means includes a reservoir containing a supply of unhardened adhesive material; said applicator means being mounted so that a portion of the periphery of said applicator means is continuously immersed in the supply of unhardened adhesive material.